March 7, 1967  N. R. STEVENSON  3,307,658
BRAKE APPARATUS FOR CARTS
Filed April 15, 1965

INVENTOR.
Norman R. Stevenson
BY Wm. T. Wofford
Attorney

United States Patent Office 3,307,658
Patented Mar. 7, 1967

3,307,658
BRAKE APPARATUS FOR CARTS
Norman R. Stevenson, Dallas, Tex., assignor to M-H Equipment Co., Inc., Duncanville, Tex.
Filed Apr. 15, 1965, Ser. No. 448,323
2 Claims. (Cl. 188—5)

My invention relates in general to those vehicles commonly known as carts, and to brake apparatus that is particularly applicable to carts of the type often utilized in freight warehouse operations.

It is the general object of my invention to provide improved brake apparatus for carts.

Another object of my invention is to provide improved brake apparatus for carts, the construction of the apparatus reducing the vibrations which normally occur after the cart brakes are applied and during transportation of the carts in self-propelled trucks or the like.

Another object of my invention is to provide improved brake apparatus for carts, the apparatus having an improved brake shoe that is easy to form, long-lasting and effective.

These and other objects are effected by my invention as will be apparent from the following description, taken in accordance with the accompanying drawing in which.

Figure 1:
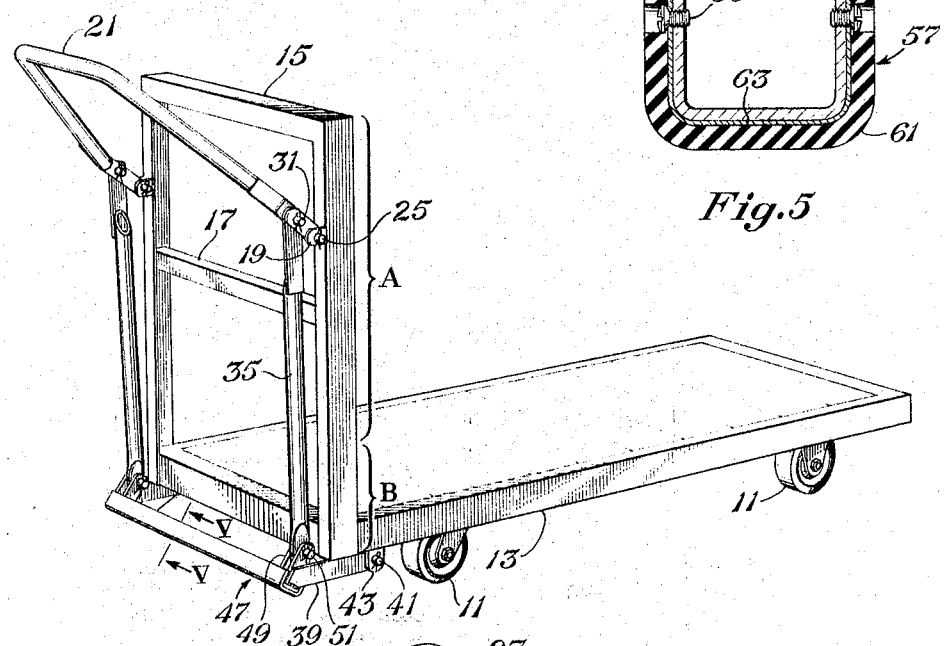
FIG. 1 is a perspective view of a cart having brake apparatus constructed in accordance with the principles of my invention.

Referring initially to FIG. 1, the numeral 11 designates conventional cart wheels, each of which is secured to a horizontal bed or body 13 of the cart. At the forward end of body 13, is secured an upright frame member 15. To add rigidity to upright fame member 15 in this particular cart, a cross bar 17 is secured thereto. The upright frame member 15 has suitable means such as protrusions 19 (which are spaced apart horizontally as seen in FIG. 3) for securing a handle 21 to the cart.

Handle 21, which in this instance is tubular and generally U-shaped, has end portions 23 that are adapted to be inserted into the spaces separating adjacent pairs of protrusions. The protrusions 19 and end portions 23 of handle 21 are apertured to receive pivot pins 25, as may be seen in FIG. 3. To retain these pivot pins 25 in place, conventional cotter keys 27 or other suitable means are used. In this particular apparatus, a face plate 29 is also retained by pivot pins 25 and a second pivot pin 31 is inserted in an aperture (not shown) in the opposite end of each face plate. Preferably, end portion 23 and face plate 29 are welded together as indicated at 30. Each pin 31 is aligned with a second aperture in a respective end portion 23 of handle 21, and is releasably retained in that position by suitable means such as cotter key 33.

Figure 3:
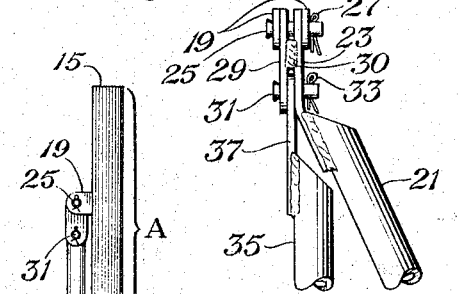
FIG. 3 is a fragmentary side elevational view of an upper portion of the brake apparatus when viewed from the left side of the cart as positioned in FIG. 2.

A pair of connecting rods 35 have end portions 37 adapted to be pivotally secured to handle 21 by the pins 31, as shown in FIG. 3. The pivot pins 25, 31 are close to each other, being separated by a distance of approximately two inches in the device shown in the drawing. Each connecting rod 35 depends substantially vertically from the handle 21, as may be seen both in FIG. 1 and in FIG. 2.

Figure 4:
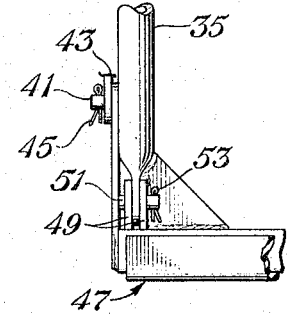
FIG. 4 is a fragmentary side elevational view of a lower portion of the brake apparatus when viewed from the left side of the cart as positioned in FIG. 2.

The protrusions 19 to which handle 21 is secured are preferably located in an upper region A of the upright frame member 15. Here, the handle is easily accessible to the hands of a standing person. Secured adjacent a lower region B of upright frame member 15 are horizontally spaced brake guide levers 39. In the device shown, these levers are attached to the cart body member 13, but it should be understood that they may be attached to the upright frame member 15. Brake guide levers 39 are pivotally connected to the cart apparatus for rotation about a horizontal axis by means of pivot pins 41, which are supported by protrusions 43 that extend from cart body 13. Suitable means for retaining pins 41 in position, such as cotter keys 45 (see FIG. 4) are provided. The brake guide levers 39 extend transversely of and are pivotally connected to connecting rods 35.

Preferably, the forwardly extending end of each brake lever 35 is secured, such as by welding, to brake shoe means 47. As may be seen particularly in FIG. 4, the brake shoe means 47 includes a pair of spaced apart brackets 49, each pair of which receives an end portion of one of the connecting rods 35. Here again, a pivotal connection is utilized that includes a pin 51 inserted into apertures (not shown) in brackets 49 and connecting rods 35. The pins are secured by a cotter key 53 (see FIG. 4) or other suitable means.

Figure 5:
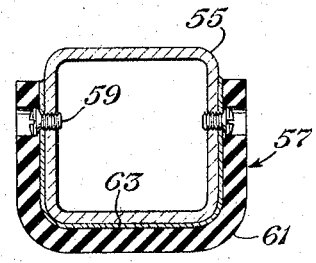
FIG. 5 is a sectional view of the brake shoe means of the brake apparatus of FIGS. 1 and 2 as seen looking along the lines V—V of FIG. 1.

The brake shoe means further includes an elongated, horizontal brake shoe support member 55, which in this instance is a metal box beam that is rectangular in cross section, as may be seen in FIG. 5. This member extends transversely across the front of the cart and is secured to brackets 49 and brake guide lever 39, as may be seen in FIG. 1. A brake shoe 57, which in this instance is generally U-shaped mates with the surface of support member 55, being retained therewith by a plurality of screws 59 or other suitable fastener means. Brake shoe 57 has an outer flexible material (such as rubber) pad 61 that is bonded to inner metal plate 63 of ductile metal such as sheets of sixteen gauge mild steel.

Figure 2:
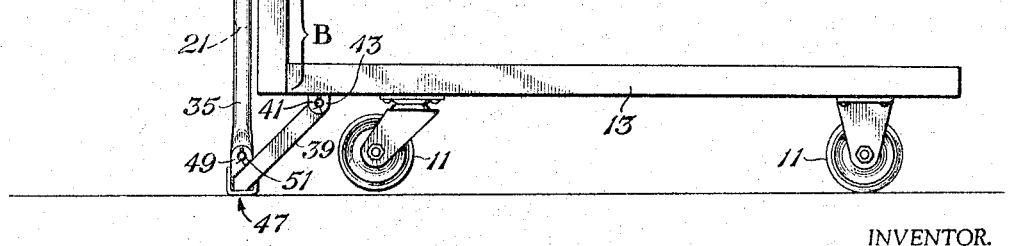
FIG. 2 is a side elevatonal view of the cart and the brake apparatus of FIG. 1.

In operation and when the cart apparatus is ready for movement, the handle 21 is raised to an upward position as shown in FIG. 1. With handle 21 in this position, connecting rods 35 support the brake guide levers 39 and brake shoe means 47 in an upward position, as may also be seen in FIG. 1. With the brake apparatus in this position, brake shoe 57 is far removed from the surface of the floor and does not interfere with the movement of the cart. To set the brake apparatus, the handle 21 is moved to a downward position as shown in FIG. 2. This rotates brake guide levers 39 and moves brake shoe means 47 downwardly until brake shoe 57 engages the floor.

The length of the above described linkages are adjusted so that the distance from the pivot pin 25 to lower surface of brake shoe 57 is slightly greater than the vertical distance from the pin 25 to the bottom of front wheels 11. If, therefore, the handle 21 is moved downward with sufficient force, the wheels 11 will be moved upwardly and suspended above the floor. This effectively prevents the cart from moving so long as the brake is set. To release the brake, the handle 21 is moved back to the upward position shown in FIG. 1, and this pulls brake guide levers 39 and brake shoe means 47 upwardly, allowing the front wheels once again to engage the floor.

The brake apparatus described above has a number of significant advantages. The mechanical linkage is simple in construction, rugged, and reduces vibrations. Occasionally, the brake is applied before the cart is completely stopped. Unless the brake is rigid, the forward motion of the cart will cause vibrations on application of the brakes. The use of the brake apparatus of FIG. 1, with its four-point connection to the cart, effectively minimizes such vibrations.

Freight is sometimes shipped in carts having the general form of a cage. In such instances, the freight is loaded into these carts, which are then rolled directly into self-propelled trucks. The brake apparatus is then applied to hold the carts in immobile positions. My brake apparatus, being very rigid as explained above, effectively minimizes vibrations of the carts and prevents them from damaging the carts themselves, the trucks which transport them, or the freight.

From FIG. 2 it may be seen that the connecting rods 35 are locked in position due to the possible over-center orientation of pin 31 with respect to pin 25. The pin 31 is capable of moving in a counterclockwise direction (as seen in FIG. 2) with respect to pin 25. Movement of pin 31 to or past vertical with respect to pin 25 effectively locks the brake into position.

The brake shoe 57 and brake shoe means 47 are extremely longlasting. The use of a brake shoe with an inner metal plate 63 to which is bonded an outer rubber pad 61 has significant advantages. When constructed in this manner, the brake shoe 57 may be attached to the horizontal brake shoe support member 55 by metal fasteners 59 so that the brake shoe may be easily removed. The inner metal plate 63 is engaged by the metal fasteners 59 and prevents the fasteners from tearing the rubber pad 61 when large frictional forces are generated by setting the brake while the cart is still moving. Moreover, the use of an inner metal plate 63 bonded to an outer rubber pad enables the manufacture of brake shoes having a wide variety of forms.

It should be apparent from the above description that the brake shoe support member 55 can have a variety of forms. Brake shoe support member 55 can, for example, be in the form of an I-beam, with the brake shoe being formed around and secured to the lower flange of the beam. In addition, while the brake apparatus in the drawing is shown as having certain pairs of parts such as connecting rod 35, it should be apparent that such linkages need not be paired, but can be used singly with minor modifications in construction and positioning of the various components. The specific means illustrated for achieving a pivotable connection between the mechanical linkages may be changed within the scope of my invention. Also, the brake shoe 57 need not be constructed of rubber as indicated in FIG. 5 but may be constructed of equivalent flexible brake shoe materials.

While I have shown my invention in only one form, it will be apparent to those skilled in the art that it is not so limited, but is susceptible of various changes and modifications without departing from the spirit thereof.

I claim:
1. Cart apparatus comprising:
(a) a wheel supported load carrying body;
(b) a frame secured at one end of said body and extending upwardly therefrom;
(c) a generally U-shaped handle having its end portions spaced a distance that is a substantial portion of the width of said body, with said end portions being pivotally secured to said frame at the upper region thereof for rotation about a horizontal axis;
(d) a pair of connecting rods disposed in parallel juxtaposed spaced relation and each having one end pivotally secured to said handle on the outer side thereof adjacent a respective end portion thereof and inwardly of the pivot axis of said handle, and with said connecting rods depending substantially vertically from said handle;
(e) a pair of brake guide levers disposed in parallel juxtaposed spaced relation and each having one end thereof pivotally secured to said cart adjacent a lower region of said frame for rotation about a horizontal axis, and the other end portion thereof pivotally secured to the lower end of a respective said connecting rod; and
(f) an elongated horizontally extending brake shoe assembly fixed at its end portions to the outer end portions of said brake guide levers and having a floor engaging surface extending substantially the entire length of said assembly.

2. The cart apparatus as set forth by claim 1, wherein said brake shoe assembly comprises an elongated support member, a brake shoe generally trough-shaped in transverse section and having a substantially planar floor engaging surface portion and side surface portions integral with and extending upwardly from said floor engaging surface portion, said brake shoe being made up of an outer pad bonded to an inner metal plate, said brake shoe being secured to said brake shoe support member by metal fasteners which engage the brake shoe side surface portions and said support member.

References Cited by the Examiner

UNITED STATES PATENTS

| | | | |
|---|---|---|---|
| 1,827,976 | 10/1931 | Enos | 188—5 |
| 2,156,178 | 4/1939 | Gyure | 188—5 |
| 2,625,989 | 1/1953 | Pond et al. | 188—5 X |
| 2,747,692 | 5/1956 | Holmes | 188—5 |

FOREIGN PATENTS

| | | |
|---|---|---|
| 147,859 | 11/1936 | Austria. |
| 680,046 | 10/1952 | Great Britain. |
| 561,954 | 3/1957 | Italy. |

MILTON BUCHLER, *Primary Examiner.*

B. S. MOWRY, *Assistant Examiner.*